US010303728B2

(12) United States Patent
Kotas

(10) Patent No.: US 10,303,728 B2
(45) Date of Patent: May 28, 2019

(54) PERSONALIZED LANDING PAGES

(71) Applicant: Amazon Technologies, Inc., Reno, NV (US)

(72) Inventor: Paul Kotas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 284 days.

(21) Appl. No.: 15/057,932

(22) Filed: Mar. 1, 2016

(65) Prior Publication Data

US 2016/0180389 A1    Jun. 23, 2016

Related U.S. Application Data

(63) Continuation of application No. 13/157,248, filed on Jun. 9, 2011, now Pat. No. 9,390,181.

(51) Int. Cl.
| | | |
|---|---|---|
| *G06F 3/048* | (2013.01) | |
| *G06F 16/9535* | (2019.01) | |
| *G06Q 30/02* | (2012.01) | |
| *G06Q 50/00* | (2012.01) | |
| *G06F 16/954* | (2019.01) | |
| *G06F 16/958* | (2019.01) | |

(52) U.S. Cl.
CPC ........ *G06F 16/9535* (2019.01); *G06F 16/954* (2019.01); *G06F 16/958* (2019.01); *G06Q 30/0255* (2013.01); *G06Q 30/0256* (2013.01); *G06Q 30/0269* (2013.01); *G06Q 30/0277* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,921,156 | B1* | 4/2011 | Stolorz ................. | G06Q 10/00 709/203 |
| 8,407,094 | B1* | 3/2013 | Axe ..................... | G06O 30/0251 705/14.73 |
| 2006/0212350 | A1* | 9/2006 | Ellis .................... | G06O 30/0242 705/14.41 |
| 2007/0061199 | A1* | 3/2007 | Montgomery ........ | G06Q 30/02 705/14.53 |
| 2007/0100688 | A1* | 5/2007 | Book .................... | G06Q 30/02 705/14.52 |
| 2007/0288514 | A1* | 12/2007 | Reitter ................ | G06F 17/30864 |
| 2008/0040175 | A1* | 2/2008 | Dellovo .............. | G06Q 10/0637 705/7.36 |
| 2008/0221987 | A1* | 9/2008 | Sundaresan ........... | G06Q 30/02 705/14.54 |
| 2008/0248788 | A1* | 10/2008 | Smith .................. | H04M 3/4878 455/414.3 |

(Continued)

*Primary Examiner* — Hua Lu
(74) *Attorney, Agent, or Firm* — Hogan Lovells US LLP

(57) ABSTRACT

Personalized landing pages can be generated for users based at least in part upon information about the individual users who are viewing the landing pages. Such information may include, for example, the consumer segments to which the individual user belongs as well as the individual users' browsing and purchasing histories and personal preferences and attributes. The landing pages are personalized to include, for example, content that may be of particular interest to the user and arranged in a manner that may appeal to the user.

20 Claims, 8 Drawing Sheets

(56) References Cited

U.S. PATENT DOCUMENTS

| | | | |
|---|---|---|---|
| 2008/0249853 A1* | 10/2008 | Dekel | G06O 30/00 705/14.48 |
| 2009/0144141 A1* | 6/2009 | Dominowska | G06Q 30/02 705/14.41 |
| 2009/0254564 A1* | 10/2009 | Nugent | G06F 17/30867 |
| 2009/0282343 A1* | 11/2009 | Catlin | G06F 17/30867 715/738 |
| 2010/0005001 A1* | 1/2010 | Aizen | G06Q 30/02 705/14.73 |
| 2010/0161411 A1* | 6/2010 | Wu | G06O 30/02 705/14.45 |
| 2010/0198772 A1* | 8/2010 | Silverman | G06Q 30/02 706/52 |
| 2010/0205057 A1* | 8/2010 | Hook | G06Q 30/02 705/14.52 |
| 2010/0306228 A1* | 12/2010 | Carpenter | G06F 17/3064 707/765 |
| 2011/0066497 A1* | 3/2011 | Gopinath | G06Q 30/02 705/14.53 |
| 2011/0173198 A1* | 7/2011 | Malleshaiah | G06F 17/30702 707/737 |
| 2011/0218862 A1* | 9/2011 | Langston | G06Q 30/02 705/14.69 |
| 2011/0264736 A1* | 10/2011 | Zuckerberg | G06Q 30/02 709/204 |
| 2012/0059713 A1* | 3/2012 | Galas | G06O 30/0244 705/14.49 |

* cited by examiner

PERSONALIZED LANDING PAGES

CROSS-REFERENCES TO RELATED APPLICATIONS

This application is a continuation of allowed U.S. application Ser. No. 13/157,248, entitled "PERSONALIZED LANDING PAGES", filed Jun. 9, 2011, of which the full disclosure of this application is incorporated herein by reference for all purposes.

BACKGROUND

Advertisers and other such entities can spend a significant amount of resources in efforts to effectively target online advertisements and other supplemental content to specific users. Textual advertising is a commonly used type of online advertising. For example, textual advertising includes the practice of placing "sponsored links" on search result pages provided by web search engines. These sponsored links are typically based on search query terms provided by the user. Contextual advertising is another commonly used type of online advertising. For example, contextual advertising includes the practice of placing advertisements on web pages, where the subject matter of the advertisements is typically relevant to at least some portion of the content presented on the web page. Retargeting advertising is yet another commonly used type of online advertising where, for example, a user is presented with an advertisement based on the user's browsing and/or purchasing history. For example, if, when browsing an online retailer web site, a user navigates to a detail web page for a particular item but does not actually purchase the item, the user may later be presented with an advertisement for that item.

Oftentimes sponsored links and advertisements, regardless of whether they are placed via textual, contextual, retargeting, or other types of advertising techniques, include a title and a few lines of text describing the product or service being advertised. Further, in some cases, sponsored links and advertisements include hyperlinks to a webpage where the user may purchase the product and/or obtain more information about the advertised products or services. These web pages that the user is navigated to in response to selecting the sponsored link or advertisement are commonly referred to as "landing pages." For example, if a sponsored advertisement is for a product, the landing page may be a web page sponsored by the product manufacturer or be an online store where the user can purchase the product or obtain more information about the product. If, after selecting the sponsored advertisement and clicking through to the associated landing page, the user purchases the product, the sponsored advertisement is said to have resulted in a "conversion." The substance and arrangement of the content presented on the landing page may influence whether a conversion occurs. For example, conversions are less likely to occur if the landing page fails to present content that is meaningful to the user than if the landing page presents meaningful content that engages the user.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Various embodiments are described for generating personalized landing pages based on a combination of information known about the individual user viewing the landing page and the entity sponsoring the landing page. Information known about a user may include, for example, browsing history, purchasing history, personal preferences, interests, attributes and other demographic data. Personalizing a landing page may include, for example, providing the landing page with content (e.g., advertisement, ad tag, reference, etc.) that may be of particular interest to the user in combination with arranging the content in a manner appealing to the user to optimize engagement with the user.

It will be helpful to have a brief example of generating a personalized landing page based on information known about the user viewing the landing page. In one example, a user selects a sponsored link or advertisement presented on a search results page that identifies a particular product. Upon selecting the sponsored ad/link, the user is navigated to a landing page for the product identified in the link/ad. To personalize the landing page, information about the user is obtained (if possible), such as the user's browsing and/or purchasing history, preferences and attributes. Information is also obtained about the product presented in the selected sponsored link or advertisement as well as information about the advertiser associated with the sponsored ad/link (e.g., top-selling products, related products, promotional products, etc.). Based on this information, advertiser products that are relevant (or likely of interest) to the user are identified and displayed in a personalized landing page. The layout of the landing page may also be personalized for the user so that the personalized landing page is aesthetically appealing to the user.

Figure 1:
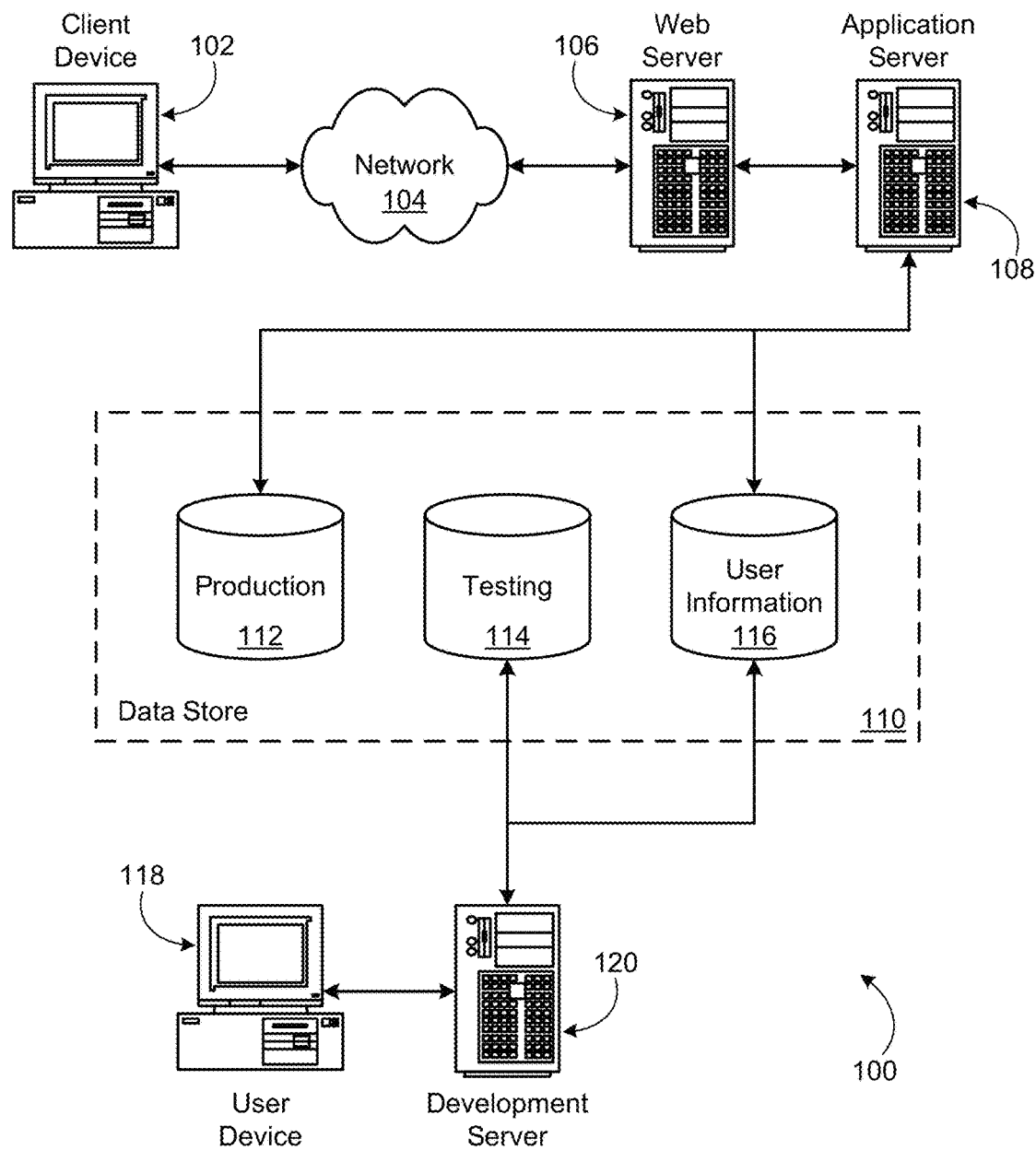
FIG. 1 is a schematic diagram illustrating an example environment for implementing aspects, in accordance with at least one embodiment.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limiting to the scope of the disclosure.

Figure 2:
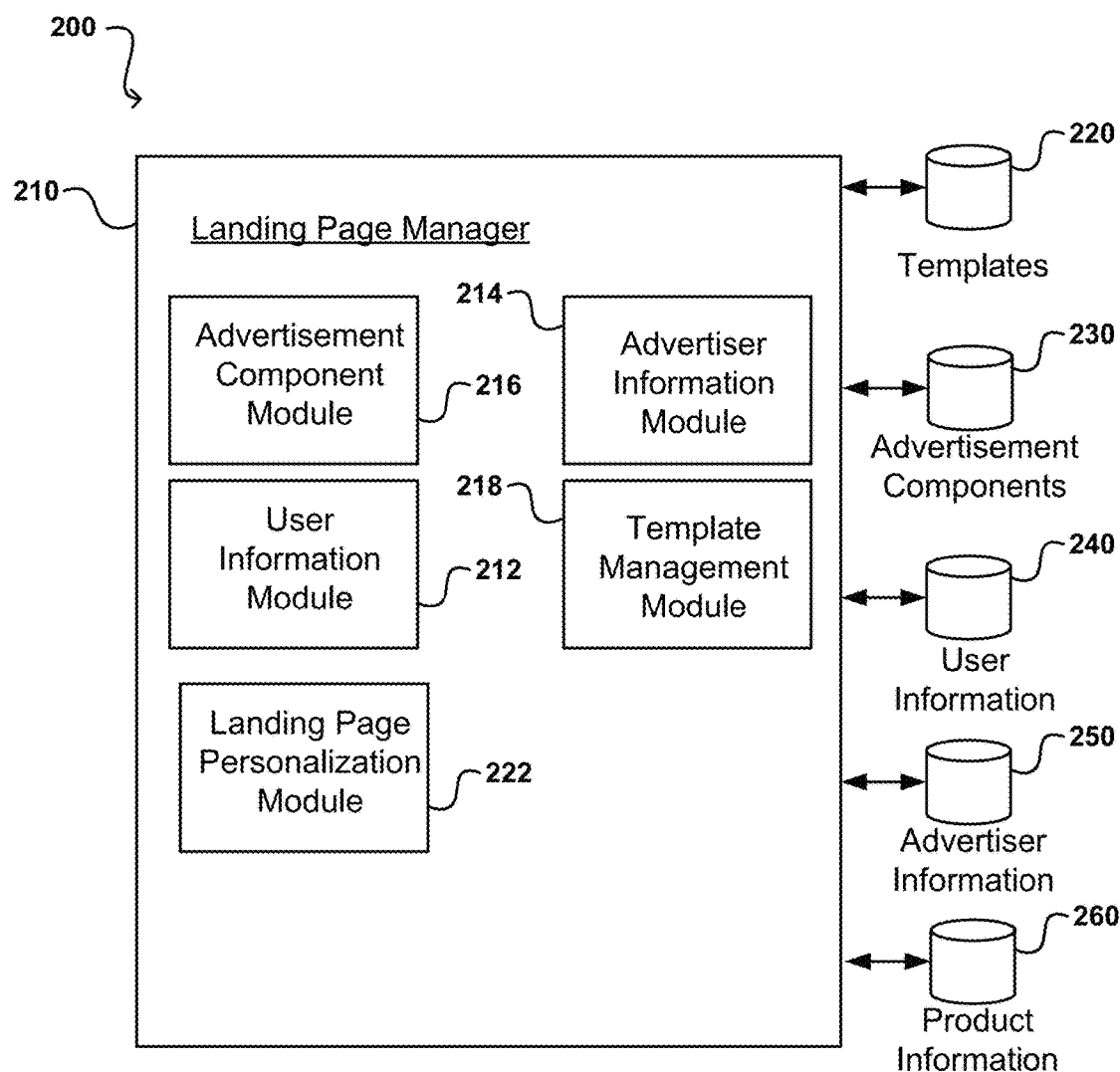
FIG. 2 is a block diagram depicting aspects of an example system, in accordance with at least one embodiment.

The environment 100 of FIG. 1 may include additional components and/or other arrangements, such as those illustrated in system 200 of FIG. 2. In this example, the system 200 includes a landing page manager 210 that responds to landing page requests that are generated when users select or otherwise access navigational elements such as sponsored links and advertisements presented in electronic interfaces such as web sites, search engines, applications, etc. The landing page manager 210, for example, responds to landing page requests by accessing information about the user that selected the sponsored ad/link as well as the advertiser(s) associated with that selected link or advertisement. Further, for example, the landing page manager 210 of the system 200 manages components for applying the information obtained about the user and the advertiser to generate personalized landing pages. According to some embodiments, such personalized landing pages present content related to the products and services associated with the selected sponsored links and advertisements as well as content related to other products and services provided by the advertisers that may be of interest to the users.

According to the illustrated embodiment, the advertisement manager 210 includes a user information module 212, an advertiser information module 214, an advertisement component module 216, a template management module 218, and a landing page personalization module 222. The advertisement manager 210 reads and/or writes data to a templates data store 220, an advertisement component data store 230, a user information data store 240, an advertiser information data store 250, and a product information data store 260. The data stores 220, 230, 240, 250, and 260 may, in some embodiments, be implemented as part of the advertisement manager 210 while in other embodiments of the present invention, the data stores 220, 230, 240, 250, and 260 are implemented separately from the advertisement manager 210.

According to an embodiment, the user information module 212 obtains user information and then optionally adds the obtained user information to the user information data store 240. User information may be obtained using various techniques. For example, user information may be obtained from a log or database of recorded browsing and/or purchasing history. Such a log or database may be created by recording the products the user has purchased online, products for which the user has viewed the detailed page, products that the user has added to an online shopping cart, products that the user has searched for, products for which the user has read consumer reviews and ratings, and the like. Further, for example, information about a user may be inferred by recording the sponsored links and advertisements for which the user has selected or otherwise accessed navigational elements, such as by clicking on the link or advertisement in a web browser. The sponsored links and advertisements that the user has selected can then be analyzed to identify common attributes of these links/ads and these attributes can be associated with the user in the user information data store 240. For example, attributes such as the color of the advertisement, the content type (e.g., video, image), size of the advertisement, placement of the advertisement, and/or other attributes might be analyzed to identify common attributes of advertisements that have successfully drawn the interest of the user in the past.

According to some embodiments, user information may be expressly provided by users. For example, some web sites provide users with configurable experiences where the users can customize at least some aspects of their experiences. For example, a web site may enable a user to create a user profile that allows the user to enter certain information and preferences. Such information and preferences may be incorporated into the user information data store 240. Inputted user information may include, for example, demographic information, such as age, gender, or income. In an embodiment, the user information module 212 may provide an interface for adding user preference information to the user information data store 240. In an embodiment, the interface may include a user interface, such as web page, that allows user information to be manually entered by a user or by an operator. In an embodiment, the interface may comprise an electronic interface, such as an application programming interface, for electronically interfacing with the user information data store 240 from an executable program to add information to the user information data store 240 or access information stored in the user information data store 240.

Further, according to some embodiments, user information includes a list of consumer segments to which a user belongs. For example, the user information module 212 may be configured to categorize users into consumer segments, and store that information in the user information data store 240. Consumer segments may be, for example, used to categorize users based on age, gender, geographic location, browsing and purchasing histories and tendencies, etc. These consumer segments may be used to select content for a landing page or a personalized web page, as will be described in more detail later.

The advertiser information module 214 obtains advertiser information and product information, and adds the obtained advertiser and product information to the advertiser information and product data stores 250, 260, respectively. Advertiser information may be obtained using various techniques. For example, advertiser and product information may be obtained by tracking the products and services that the advertiser promotes and sells online. For example, when an advertiser sponsors an advertisement or a link for a product or service, the advertiser information module 214 stores information about the product or service in the advertiser and product information data stores 250, 260. As such, the advertiser information module 214 fills the advertiser and product information data stores 250, 260 with information about advertisers' products and services. In addition to providing the advertiser and product information data stores 250, 260 with information about advertisers' products and services, the advertiser information module 214 provides the advertiser and product information data stores 250, 260 with analytics that indicate the relative success of the sponsored links and advertisements that the advertiser has sponsored in the past.

According to some embodiments, advertiser information may be expressly provided by the advertiser. In an embodiment, the advertiser may provide information indicating which products the advertiser wants presented on personalized landing pages. For example, the advertiser may provide information about its top-selling products, newest products, and products within a certain price range. Further, advertisers may provide information that indicates which of its products complement each other. Thus, when a product is featured in a sponsored link or advertisement, complementing products can be presented on the landing page in addition to the product referenced in the sponsored link or advertisement. For example, if the sponsored link or advertisement is directed to a particular digital camera, the landing page may present advertisement components directed to camera cases, batteries, external flashes, a different digital camera and the like.

According to an embodiment, the advertiser information module 214 may provide an interface for adding advertiser and product information to the advertiser information data stores 250, 260. In an embodiment, the interface may include a user interface, such as web page, that allows advertiser information to be manually entered by an advertiser or by an operator. In an embodiment, the interface may comprise an electronic interface, such as an application programming interface, for electronically interfacing with the advertiser and product information data stores 250, 260 from an executable program to add information to the advertiser and product information data stores 250, 260 or access information stored in the advertiser and product information data stores 250, 260.

The advertisement component module 216 obtains advertisement components and corresponding attribute information. Further, the advertisement component module 216 categorizes and stores the advertisement components and corresponding attribute information in the advertisement component data store 230. For example, the advertisement component module 216 may categorize advertisement components as being components that appeal to certain segments of users. Advertisement components and, thus, the advertisement component data store 230 may include advertising content such as text, images, video content, animated content such as flash and/or other advertising content. The advertisement component module 216 may obtain advertising components from third parties, such as advertisers of products and services, and may contain "house" or stock content used to supplement or enhance advertising content provided by the advertisement provider.

According to an embodiment, advertisement components stored in the advertisement component data store 230 may be categorized based on the attributes of the individual advertisement components. These attributes may include, but are not limited to, the product type or service type for advertisement components that are directed to specific products or services, the predominant colors featured in the advertising components, the size of the advertisement components, and the media type of the advertisement component. These attributes may be used to select advertisement components for personalizing landing pages for users.

The template module 218 creates and/or obtains landing page templates used for personalizing landing pages and stores the landing page templates in the templates data store 220. According to an embodiment, each of the landing page templates includes at least one impression that is filled with advertising content to create a personalized landing page for the user. An example landing page template 300 is illustrated in FIG. 3*a*.

Figure 3A:
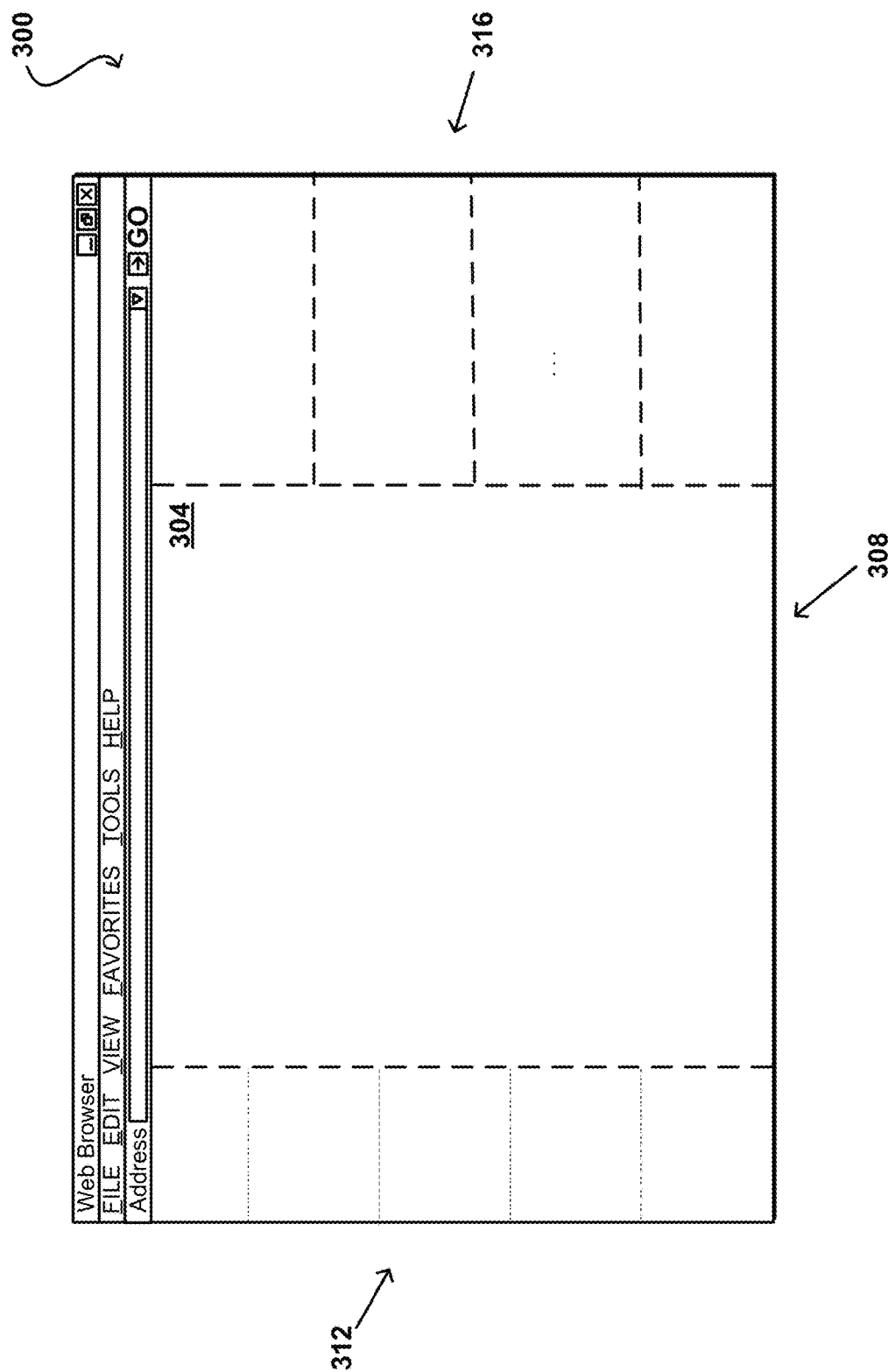
FIGS. 3a-c are schematic diagrams illustrating an example landing page template, in accordance with at least one embodiment.

With reference to FIG. 3*a*, the example landing page template 300 includes a background 304, an impression 308, a first set of impressions 312 and a second set of impressions 316. It should be appreciated that the configuration of impressions shown in FIG. 3*a* is exemplary only and is not intended to limit the scope of the technology described herein. The background 304 may have a customizable theme that includes color schemes, font sizes and styles, icons, graphics, etc. In an embodiment, the landing page personalization module 222 selects a background 304 based on the user's attributes and preferences. The template 300 may designate the type of content to fill each of the impressions. As one example, the template 300 may designate that the impression 308 be filled with an advertisement (or information) directed to the product or service identified in the sponsored link or advertisement that was selected by the user. The impressions 312 may be populated with various advertisements that are directed to other products and services offered by the advertiser. For example, impressions 312 may be populated with the advertiser's products that are similar to, or that complement, the product(s) presented in the impression 308, the advertiser's top selling products, the advertiser's newest products, etc. According to an embodiment, the advertiser specifies the advertising content of impressions 312. For example, instructions that indicate which advertisement components are directed to which products may be located in the advertiser and product information data stores 250, 260. However, it should be appreciated that the landing page personalization module 218 could select the advertising content for impressions 312. Impressions 316 may be populated with advertisements that may be of interest to the user based on available user information. In an embodiment, the landing page personalization module 222 may access the user information data store 240 to determine which advertisements of the advertisement component data store 230 may appeal to the user or to a segment of users who have similar traits or behaviors. For example, the landing page personalization module 222 may identify the consumer segments to which the user belongs, and then access the advertisement component data store 230 to identify advertisements that may appeal to users of those consumer segments.

Figure 3B:
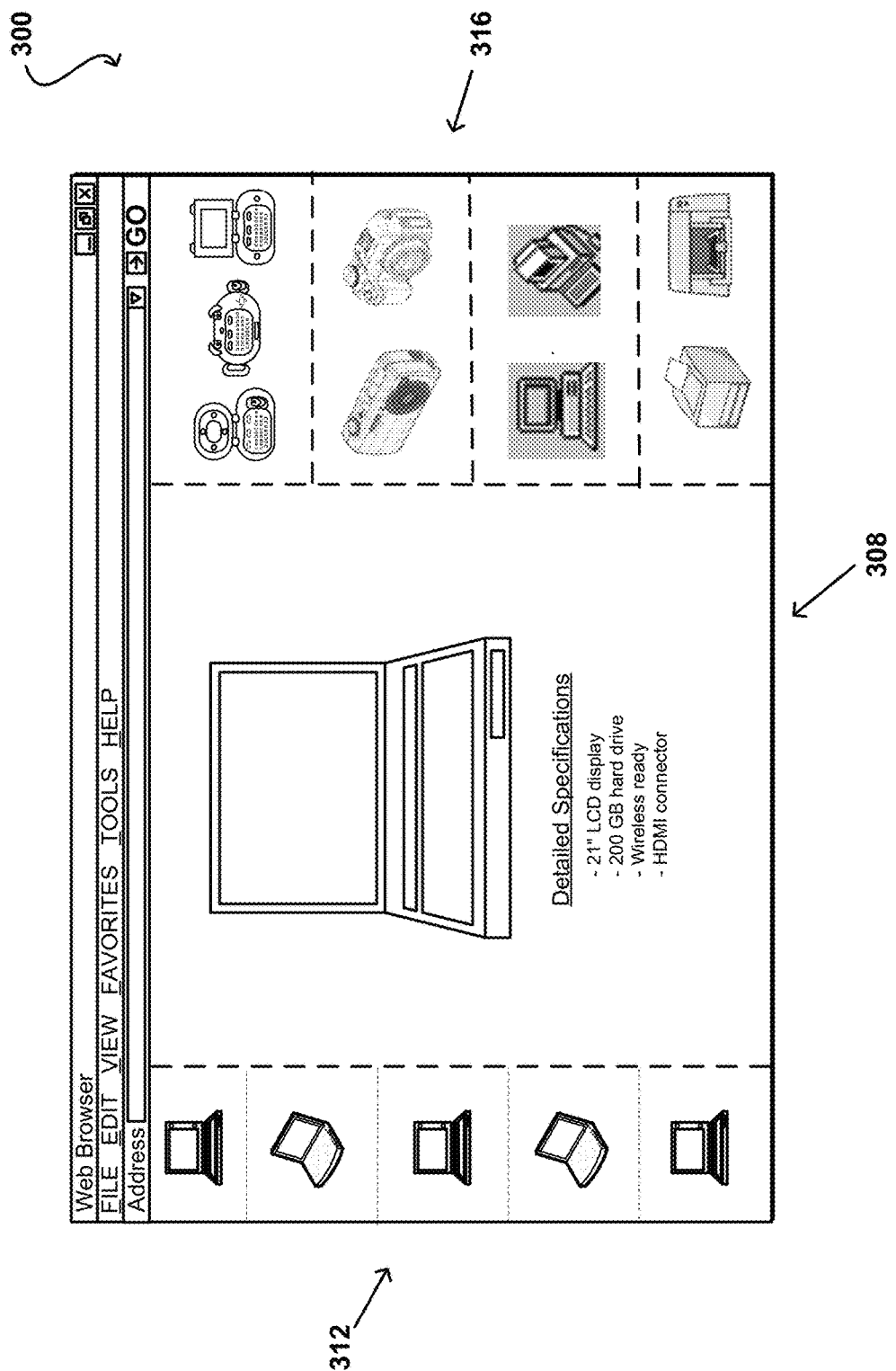

FIG. 3*b* illustrates an example landing page that may be presented in response to a user selecting a sponsored advertisement a laptop computer. Although this example will be described with reference to a user selecting a sponsored advertisement, this example may be equally described with reference to a sponsored link or other reference as well. Throughout this application, the terms "advertisement," "ad," "link," "content" and the like may be used interchangeably. In the FIG. 3*b* example, the impression 308 displays an advertisement directed to the laptop computer associated with the selected sponsored ad. The impressions 312 display various advertisements directed to other laptops offered by the same or different advertiser (associated with the sponsored ad). For example, the laptops displayed in impressions 312 may be the advertiser's top selling laptops. The specific laptops displayed in impressions 312 may be further refined by a price range that the user is likely to find acceptable based on data contained in the user information store 240 (or other sources). It should be appreciated that the advertisements may be selected by the entity providing the landing page or by the advertiser.

The impressions 316 shown in FIG. 3*b* may, in this example, display advertisements directed to other items that are provided by the advertiser and/or a strategic partner of the advertiser. For example, the products illustrated in the impressions 316 of FIG. 3*b* include toy computers, digital cameras, desktop computers, and printers. Each of the items displayed in one of the impressions 316 may be selected, in part, based on information known about the user. For example, the toy computer may have been selected for display based in part on the user's purchase history indicating that the user has recently purchased a children's toy. The digital camera may have been selected for display based in part on the user's browsing history indicating that the user recently viewed a digital camera online. The desktop computer and the printer may have been selected for display based on knowledge that consumers categorized in a consumer segment similar to the user (e.g., small business owner) often buy desktop computers and printers at the same time. Other types of information may be used to personalize the displayed items. For example, to identify the other similar items, a search query may be created based on the features of the item that was the subject of the sponsored link or advertisement and then used to identify the other similar items.

Figure 3C:
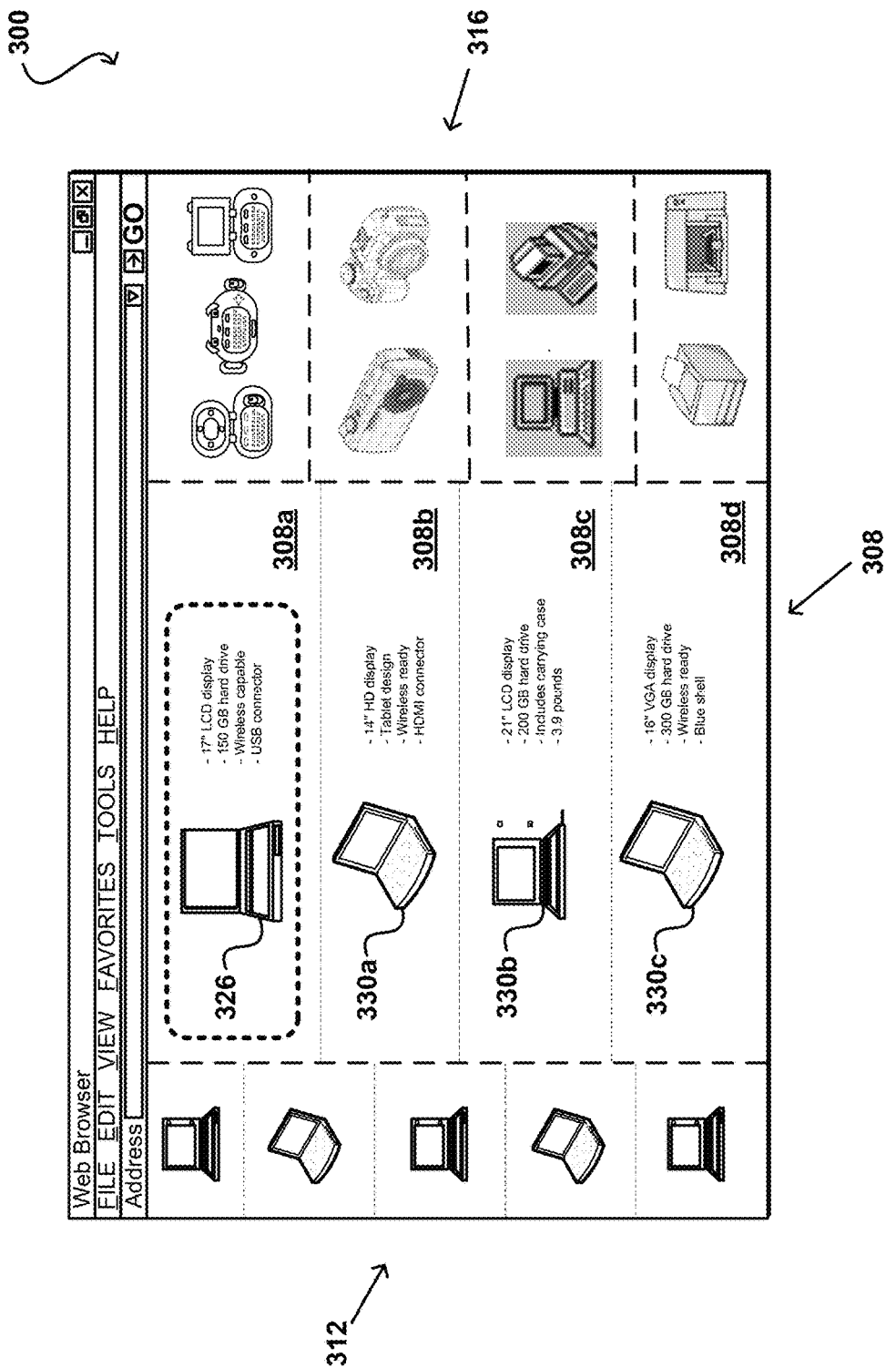

According to the embodiment illustrated in FIG. 3c, the item that was the subject of the sponsored link or advertisement may be presented in a first set of impressions 308 along with other, similar items so as to give the user additional items to choose from. According to an embodiment, the other items presented in impressions 308 may be identified based in part on the query terms that triggered the sponsored ad. For example, in the event the landing page is hosted by an online retailer, the query terms that triggered the sponsored ad may be used to search across the retailer's inventory to identify the other similar items that are relevant to the query terms. Also, for example, the other items presented in impressions 308 may be other items that are provided by the advertiser and that are in the same category of items as the item that was the subject or the sponsored link or advertisement. In the illustrated example, laptop computer 326, which was the subject of the sponsored advertisement, is displayed in impression 308a and laptops 330a-c are displayed in impressions 308b-380d. As illustrated, the item that was the subject of the sponsored link or advertisement may be highlighted to distinguish it from the other items. Such highlighting may include enclosing the item in a box or using bold, large or uniquely colored font, etc. According to the illustrated embodiment, impressions 312 and 316 of FIG. 3c display content similar to that shown in FIG. 3b. As such, in addition to displaying items selected based on the user's information (impressions 316), items designated by the advertiser (impressions 312), and the item that was the subject of the sponsored link (impressions 308a), the landing page template 300 of FIG. 3c also displays search-result items (computers 330a-c). It should be appreciated that in some embodiments the search-result items shown in impressions 308b-d consist only of the advertiser's items (i.e., items provided by the advertiser that sponsored the link), whereas in other embodiments, such as the embodiment illustrated in FIG. 6, the search-result items consist of items from multiple advertisers.

It should be appreciated that the landing page template 300 shown in FIGS. 3a-c is merely an example and that any landing page template having any number and configuration of impressions may be provided. Further, it should be appreciated that the landing page template may only include one or two of the three sets of impressions 308, 312, 316. For example, if user information is not available, then the landing page template may only include one set of impressions for advertisement components directed to the subject of a sponsored link or advertisement and another set of impressions for advertisement components selected by the advertiser and directed to items other than those that are the subject of the sponsored link or advertisement. Further for example, if the advertiser has not provided advertising content for other items that it would like to promote, the landing page template may only include one set of impressions for advertisement components directed to the subject of a sponsored link or advertisement and another set of impressions for advertisement components selected based in part on users' user information.

For illustrative purposes, consider an example where a user selects a sponsored link displayed along with search results returned in response to a query for a particular brand and model of digital camera (e.g., Canon® D60). In this scenario, suppose the advertiser that sponsored the link is the manufacturer of the camera (e.g., Canon®). In response to selection of the sponsored link, the user is navigated to a Canon® landing page displaying advertisements and promotions for the Canon® D60 camera as well as advertisements and promotions directed to other Canon® cameras, accessories and/or other products (e.g., Canon® printer).

Using the landing page template 300 shown in FIG. 3a, impression 308, which is the most prominent in the UI, may display advertising related to the particular model of camera mentioned in the selected sponsored link (Canon® D60). The impressions 312 may display advertising components related to other popular camera models provided by the advertiser (Canon®). Presenting the user with other Canon® camera models may have many advantages. For example, at least one of the other camera models may present an upsell opportunity (e.g., one of the cameras displayed in impression 312 is more expensive than the camera displayed in impression 308). Displaying more than one camera model may also illustrate to the user that other models are available from the same manufacturer in the event the user decides the camera displayed in impression 308 is not what they were looking for. It is within the scope of the technology described herein to vary the size of each impression 308 (e.g., each impression 308 does not have to be the same size, shape, etc.). In one embodiment, the cameras displayed in impressions 308 are selected by the advertiser. In other embodiments, one or more of the camera models displayed in impressions 308 may be selected by a third party such as, but not limited to, a merchant and the like.

Continuing with this example, impressions 316 may display other products offered by the advertiser (Canon®). These products may be directly related to the camera displayed in impression 308 (e.g., camera bag, camera lens, etc.), related to another product, not related directly to the camera, that may be of interest of the user (e.g., Canon® printer) and the like. The landing page personalization module 222 may also select a background 304 for the landing page based on the user's preferences or more general target segments that they may belong to.

It should be appreciated that, although the landing page template 300 includes three sets of impressions, landing page templates considered herein may include any number, or arrangement of, impressions. It should be further appreciated that content displayed in any of the impressions of a landing page may be any type of advertising content directed to any subject for any reason, and that the advertising components may be selected by the advertiser, the landing page personalization module 222, and/or any other entity.

The landing page personalization module 222, according to this embodiment, is configured to personalize landing pages using advertisement components from advertisement components data store 230 based on information obtained from the user information data store 240 and the advertiser and product information data stores 250, 260, further in view of the subject matter of the selected sponsored link or advertisement. For example, the landing page personalization module 222 processes requests for landing pages received by the advertisement manager 210 from a client, such as a web server requesting a landing page in response to a user selecting a sponsored link or advertisement. The landing page personalization module 222, among other things, obtains landing page templates from the templates data store 220, selects from the advertisement component data store 230 advertisement components related to products and/or services of interest (e.g., the products promoted in relevant sponsored links and advertisements selected by users), and provides the advertisement components for display in the impressions of the selected template. It should be appreciated that in some embodiments the advertisement components are selected and provided by the advertisers. For example, the landing page personalization module 222 can request advertisement tags from the advertiser and then add those ad tags to impression 308, 312, 316. When the landing page personalization module 222 is rendering a landing page, the advertisement tags call the advertiser's ad server to retrieve the actual advertisements that are to be presented on the landing page. Further, the landing page personalization module 222 may access user information (of the user that selected the sponsored ad, if the user can be identified) and the advertiser's information (of advertiser(s) associated with the landing page), and select advertisement components based on the user and advertiser information. According to some embodiments, the landing page personalization module 222 accesses the user information in the user information data store 240 via the user information module 212. In other embodiments, the landing page personalization module 222 may access user information data store 240 directly to retrieve user information. Further, according to some embodiments, the landing page personalization module 222 may access the advertiser information in the advertiser information data store 250 via the advertiser information module 214, while in other embodiments, the landing page personalization module 222 may access advertiser information data store 250 directly to retrieve advertiser information.

According to an embodiment, the landing page personalization module 222 is further configured to optimize landing pages based on user responses. For example, when optimizing the landing pages, the landing page personalization module 222 may utilize user information contained in the user information data store 240. Such user information may be obtained by tracking users' browsing and/or purchasing histories, such as by tracking the advertisements that have been presented to users and users' responses to such advertisements. Such responses include whether users purchased the advertised products, viewed detailed pages about the products, added the products to online shopping carts, read or provided consumer reviews about the products. Such optimization includes, for example, determining how to best present various types of advertisements. For example, by reviewing user information across a plurality of users, the landing page personalization module 222 can learn how to best present advertisements for consumer electronics makers, consumer package goods providers, payment providers, automobile makers, etc. Further, the landing page personalization module 222 can learn how to best present advertisements in a manner that drives the greatest interaction with the advertisements.

Figure 4:
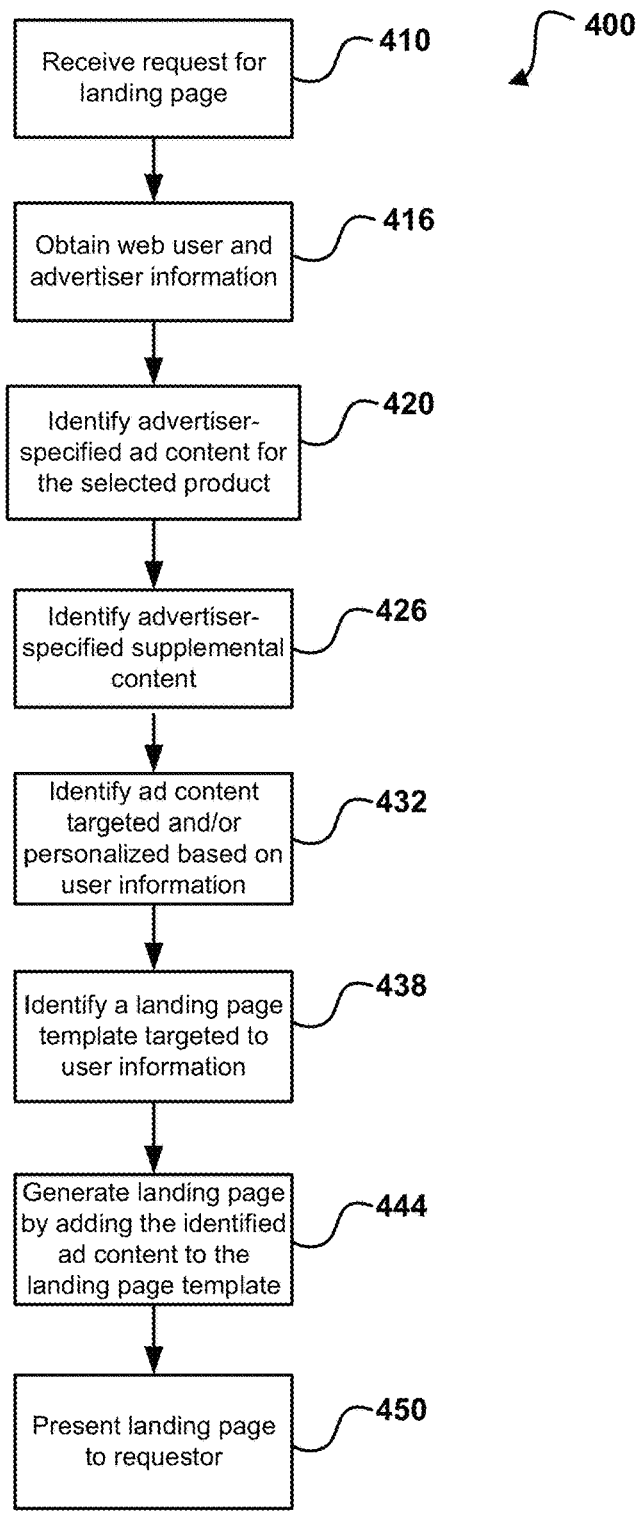
FIG. 4 provides a flow diagram illustrating an example process whereby the example system of FIG. 2 is used for generating personalized landing pages, in accordance with at least one embodiment.

FIG. 4 illustrates example steps of a process 400 for generating personalized landing pages in accordance with one embodiment. As indicated at block 410, a request for a landing page is received. For example, a request to view a landing page may be received in response to a user selecting or otherwise accessing an element of a sponsored link or advertisement. The request may include, for example, identification of the product featured in the sponsored ad, the identification of the advertisement to be presented, etc.

At 416, the user information associated with the user that selected the sponsored ad (if identifiable) and the advertiser's information (of advertiser associated with the sponsored ad/link) is obtained. In an embodiment, each user and advertiser may be assigned a unique identifier and information related to the users and advertisers may be located and obtained using the unique identifiers. It should be appreciated that users may also be identified by using various methods, such as using the Internet Protocol (IP) address of the user's computer system or via a login identifier that the user has used to access content on a content provider's website or an http cookie. Further, it should be appreciated that advertisers may also be identified by using various other methods, such as using the hyperlink of the sponsored link or advertisement that was selected by the user to request a landing page.

According to an embodiment, user information may be obtained from third parties, such as social networks, that can provide additional information about the user as well as information about others that are connected to the user in some manner (e.g., friends of a user, users in the same community, etc.). For example, social networks may provide information about brands and products that are of interest to the user or the user's friends. If the user or the user's friends self-identity with or express an interest in a particular brand or product, then a landing page for that user may be personalized with advertising content for that brand or product. The landing page may be personalized with advertising content for products that the user's friends have purchased or products for which the user's friends have written favorable reviews. For example, if five of the user's friends have purchased a particular product, then a landing page for that user may be personalized with information about that product and an indication that five of the user's friends have purchased that product. The landing page may include the names of the user's friends that have purchased the product and comments those friends have made about the product. According to an embodiment, if the landing page is sponsored by a particular advertiser, then brands and/or products that are suggested by the user's friends are filtered to only include brands and/or products that are provided or approved by the sponsoring advertiser.

It should also be appreciated that, if the user information data store 240 does not contain any information for a particular user (or the user cannot be identified), user information for other users having similar attributes might be accessed and used to help select content to display on the landing page. For example, the user information of users located in the same or similar geographic location as the unknown user may be used. In this case, an IP address may be used to determine geographic location. Also for example, the user information of other users may be used, where the other users have similar demographic information, such as age, gender, or income. Such demographic information may inferred by identifying common attributes in users' browsing habits and the content that users have viewed. Further, for example, such demographic information may be inferred based on products for which the user has viewed the detailed page, products that the user has added to an online shopping cart, products that the user has searched for, products for which the user has read consumer reviews and ratings, and the like It is also within the scope of the technology described herein to select content for display on the landing page based on information provided by the advertiser or another entity without any knowledge of user information. For example, the advertiser may designate one or more default advertisements to be presented in the in event no information is available for the user.

At 420, content designated by the advertiser to promote the product or service associated with the sponsored link (or other source document) is identified. In some instances, the landing page personalization module 222 obtains the content from the advertisement components data store 230 for display in the landing page based on the sponsored link or advertisement selected by the user. In other instances, the landing page personalization module 222 receives the content from the advertiser.

At block 426, supplemental advertising content designated by the advertiser is identified. For example, supplemental advertising content may be any content promoting a product or service other than the item associated with the sponsored link, advertisement, and the like selected by the user. By way of example only, supplemental content may include the advertiser's most popular products or services, the advertiser's products or services that are within a certain price range, the advertiser's newest products or services, the advertiser's products or services that complement or are related to the "primary" product(s) displayed on the landing page or the advertiser's products or services that are most relevant to the user. According to an embodiment, the advertiser designates the supplement advertising content that is to be presented on the landing page along with the advertising content designed to promote the products or services that were the subject of the user-selected sponsored link or advertisement. It should be appreciated, however, that the landing page manager 210 could designate the supplemental advertising content on behalf of the advertiser. Further, it should be appreciated that the step indicated at block 426 is optional and that supplement advertising content may be omitted from the landing page.

In addition to identifying advertiser-designated supplemental advertising content, advertising content that is targeted to the user's information is identified, according to block 432. For example, the advertising content displayed to a user could be selected based on the user's membership in a targeted segment (e.g., new parent). As another example, the advertising content displayed to a user could be personalized based on information known about the user (e.g., purchase history). In operation, for example, the landing page personalization manager 222 may access the user's information in the user information data store 240 as well as advertisement components in the advertisement components data store 230 and then identify advertisement components that correspond to the user's information and/or the segments to which the user belongs. For example, advertisement components having content that corresponds the user's information may be identified by comparing the segments to which the user is assigned to the segments to which attributes the advertisement components appeal, as indicated by the attributes of the advertising content. Further, for example, advertisement components having content that corresponds to the user's information may be identified by comparing the attributes of the user's information to the attributes of the advertisement components to identify matches. In an embodiment, advertisement components having targeted content are identified based on the attributes of the content, such as the products and services featured in the advertisements, the manufactures and providers of the products and services featured in the advertisements, types of advertisements, colors schemes of advertisements, sizes of advertisements, types of images, and gender of featured models. For example, a particular user may have an interest in music, so supplemental advertising content related to music-related products may be selected over other advertisements having attributes less relevant to the user's preferences and attributes as indicated by the user's information.

As indicated at block 438 a landing page template is selected. Features of the landing page template (e.g., background, font size, etc.) may also be personalized for the user. For example, using information known about the user, the color of the background of a landing page, font sizes and styles and the like may be customized to appeal to the user.

At block 444, the landing page is generated by rendering content in each of the impressions of the selected landing page template. For example, advertising content directly related to the subject of the selected link or advertisement may be rendered in a first set of impressions of the template. Advertising content directed to products or services offered by the advertiser that are related to the subject matter may be rendered in a second set of impressions of the template. As discussed above, this type of content may be directed to, by way of example only: (1) products offered by the advertiser that are similar, or complementary to, the "primary" product displayed in the landing page; (2) the advertiser's top selling products; (3) the advertiser's newest products; and/or (4) products offered by the advertiser that are within a particular price range. Content selected based in part on information known about the user may be rendered in a third set of impressions of the template. According to an embodiment, the advertising content rendered in the various impressions may be rank-ordered based on relevance to the item that is the subject of the sponsored link or advertisement, based on relevance to user's user information, etc. Further, for example, if the landing page template cannot accommodate all of the relevant advertising content (e.g., ten relevant advertisements were identified, but the template contains only three available impressions), then the landing page personalization manager 222 may rank advertising content based on relevance to the users' user information, relevance to the item(s) that is the subject of the sponsored link, priority rules established by the advertiser, etc. and select the advertisements for the landing page based on the ranked order. Also for example, the advertiser can select the advertising content on the fly. For example, when the landing page personalization module 222 is rendering a landing page, the advertisement tags that have been applied to the impressions of the landing page template "call" the advertiser's ad server to retrieve to the actual advertisements that are presented on the landing page. When the call is made, the advertiser can use the user information (e.g, IP address, purchase history, etc.) to select the advertisement.

At 450, the personalized landing page is presented for display to the user. It is not required that each set of impressions in the template are limited to a certain type of content. For example, the impressions 316 shown in FIG. 3a may display any combination of the "primary" advertiser content, related advertiser content or content selected based on information known about the user.

Figure 5:
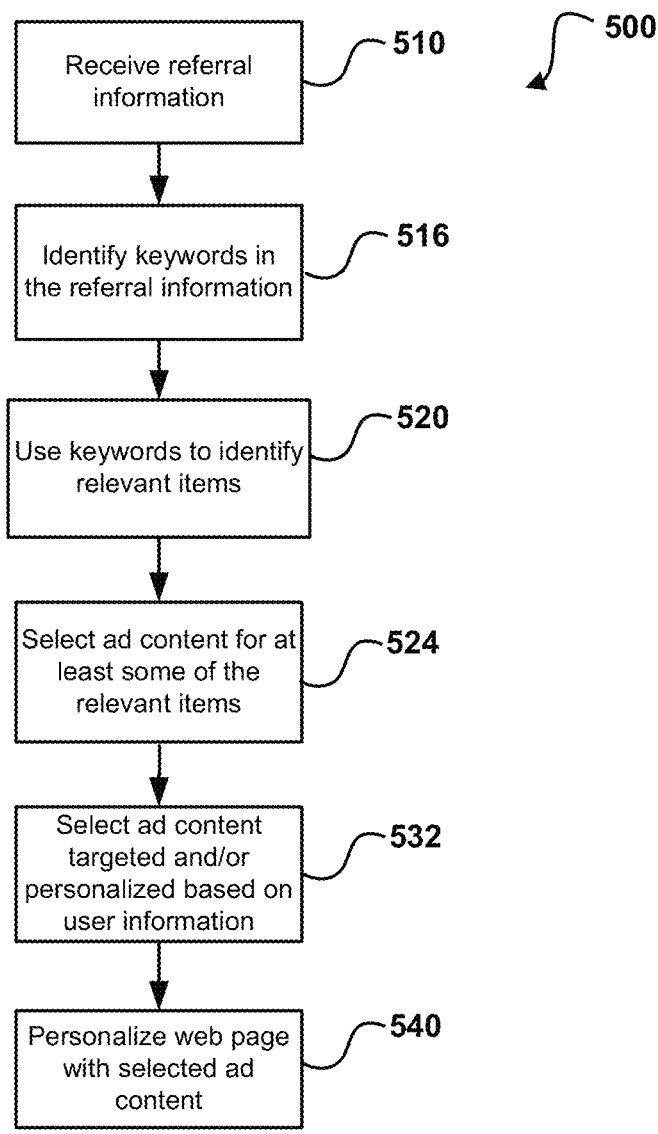
FIG. 5 provides a flow diagram illustrating another example process whereby the example system of FIG. 2 is used for generating personalized landing pages, in accordance with at least one embodiment.

FIG. 5 illustrates a process 500 for personalizing web pages with advertising content provided by multiple, different vendors (i.e., advertisers). For example, upon a user selecting a link presented by a search engine on a search result page that displays a set of search results for a search query submitted by the user, the process 500 generally proceeds by receiving referral information from the search engine, identifying keywords of the user's search query in the referral information, searching across the items of multiple vendors to identify items that are relevant to the keywords, and personalizing the web page associated with the selected link with advertising content from multiple vendors directed to the relevant items.

At block 510, referral information is received. The referral information may be received in any number of ways. By way of example only, referral information may be received from a search engine being utilized by a user in response to selecting a particular search result. In this instance, the search engine has provided search results to the user based on a search query submitted by the user. Upon selecting the search result, the user was navigated away from the search results page to the web page associated with the search result. Following this example, the search engine may provide the landing page manager 210 with the URL encoded with the referral information.

At block 516, keywords are identified in the referral information. Many search engines, for example, use URLs to encode the keywords contained in a query. In these instances, identifying keywords in the referral information may include identifying a domain of a referring URL and applying a set of rules applicable to the domain to identify the keywords. While the present disclosure discloses identifying keywords, it should be understood that at times a single keyword may be identified, such as when a user submits a search query consisting of a single word. At block 520, these keywords may be used to identify relevant vendor items. For example, in the event the entity that is personalizing the web page is an online retailer, the online retailer may use the keywords extracted from the referring URL to identify items in its inventory that are relevant to the keywords.

At block 524, the process 500 involves selecting advertising content for at least some of the items that were identified as being relevant to the keywords. According to an embodiment, the step indicated at block 524 involves selecting advertising content for particularly relevant items, thereby filtering the advertising content to only include advertising content for the most relevant items. By way of example only, the step indicated at block 524 may include selecting advertising content for the five most relevant items. Further, according to an embodiment, the step indicated by block 524 may include identifying advertising content associated with the highest bid amounts from among the advertising content available for the relevant items.

It should be appreciated that the step of identifying items that are relevant to the keywords as indicated at block 520 may be optional. For example, instead of or in addition to identifying items that are relevant to the keywords and then selecting advertising content for the identified items, the process 500 could involve selecting advertising content for the keywords that were extracted from the referral information, thereby omitting the step of identifying items that are relevant to the keywords. According to an embodiment, the advertising content selected according to block 524 is selected regardless of the vendor/advertiser associated with the advertising content.

At block 532, advertising content is selected based in part on information known about the user. This could be accomplished according to one or more of the examples provided above with reference to block 432 of FIG. 4. For example, the landing page personalization manager 222 may access the user's information in the user information data store 240 as well as advertisement components in the advertisement components data store 230 and then select advertisement components that correspond to the user's information and/or the consumer segments to which the user belongs. According to this example, advertisement components having content that corresponds the user's information may be identified and selected by comparing the attributes of the user's information to the attributes of the advertisement components to identify matches. It should be appreciated that, when identifying advertising content according to block 532, relevance to the keywords extracted from the user's search query may also be considered. Accordingly, advertising content that may not have been selected according to block 524 because it is not as relevant to the keywords as other advertising content may nonetheless be selected according to block 532 as being relevant to the user's information and relevant to the keywords of the user's search query. According to an embodiment, the advertising content selected according to block 532 is selected regardless of the vendor/advertiser associated with the advertising content.

At block 540, the web page associated with the selected search result is personalized with relevant advertising content and presented to the user. According to an embodiment, the web page is personalized by populating at least a portion of the web page with at least some of the advertising content selected according to blocks 524 and 532.

Figure 6:
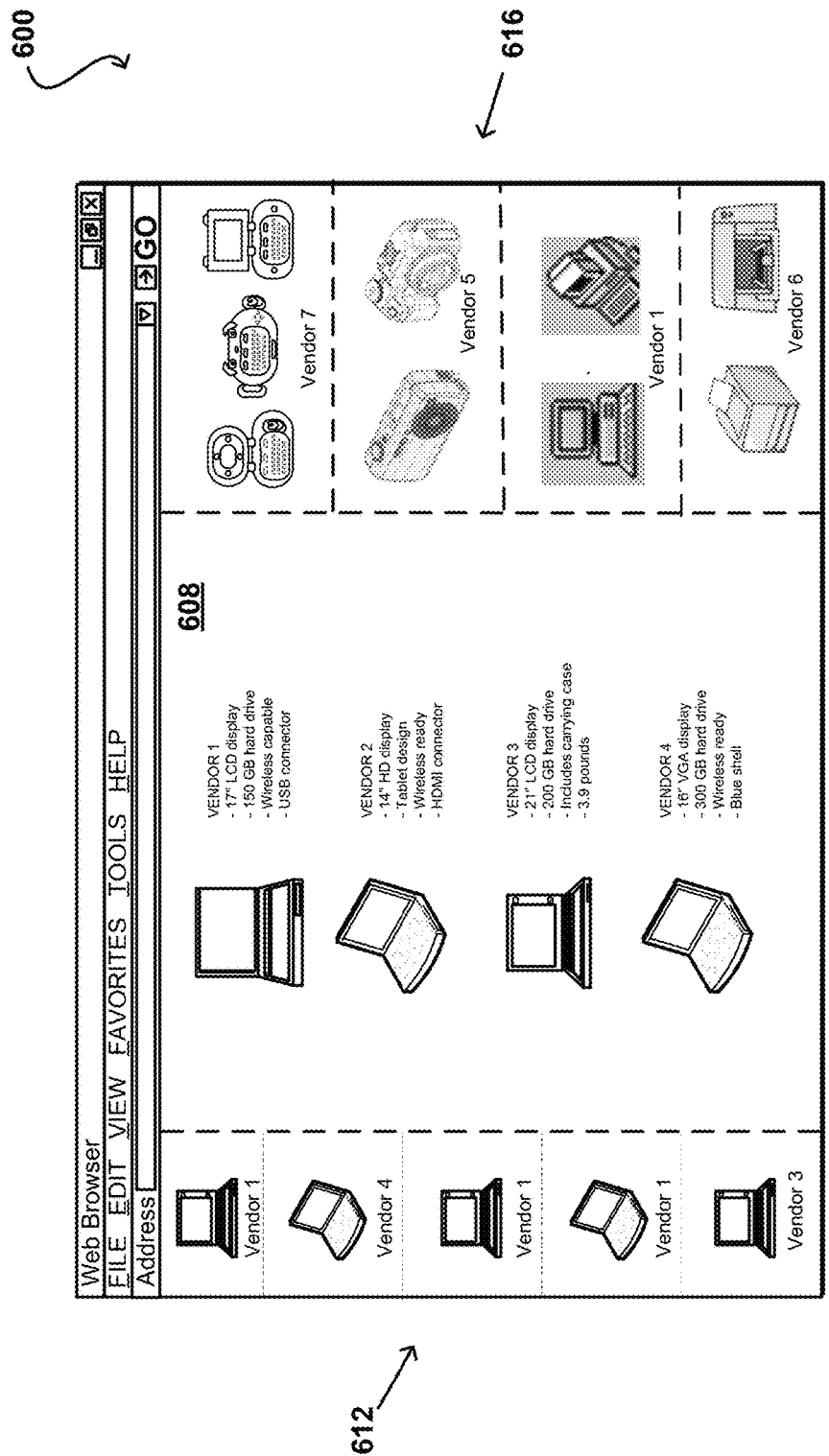
FIG. 6 is a schematic diagram illustrating an example landing page template, in accordance with at least one embodiment.

FIG. 6 illustrates an example of a personalized landing page 600 that displays search results based on the subject matter of a sponsored ad plus additional content from multiple vendors/advertisers based on one or more of the query terms that triggered, in part, the sponsored ad. According to an embodiment, the personalized landing page 600 presents items offered for sale by multiple vendors, suppliers, etc., instead of items associated with a single vendor. For example, the sponsored ad may be associated with an online retailer and the subject matter of the sponsored ad may be directed to categories of items, such as items that are on sale, items that are subject to special promotions, etc. instead of a single item.

For example, suppose the sponsored ad was from "Electronics Warehouse" and advertised "Top Laptops at a Discount!". Upon the user selecting the sponsored ad, laptops provided by multiple laptop manufacturers are presented in the personalized landing page 600. Impression 608 may display the top discounted laptops (regardless of vendor) that are for sale at "Electronics Warehouse." Impressions 612 and 616 may display other items from other vendors based on query terms provided by the user, information known about the user, such as the customer segments to which the user belongs as well as the user's purchase history, browser history, demographic information, etc. For example, impressions 612 may display advertising content directed to items that are offered for sale by "Electronics Warehouse" and that are relevant to the search query terms provided by the user (e.g., the search terms provided by the user that generated the search results page with the sponsored ad). This could be accomplished according to one or more of the examples provided above with reference to blocks 520 and 524 of FIG. 5. Also for example, impressions 616 may display advertising content selected based in part on information known about the user. This could be accomplished according to one or more of the examples provided above with reference to block 432 of FIG. 4 and/or block 532 of FIG. 5. It should be appreciated that the search-result items and the advertising content selected for presentation in the landing page 600 may be selected regardless of vendor. As illustrated in FIG. 6, the displayed search-result items and advertising content are associated with seven different vendors (e.g., Vendor 1, Vendor 2, etc.).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of generating content, the method comprising:
   under the control of one or more computer systems configured with executable instructions,
   receiving a request to access a landing page, the landing page being associated with an entity and a template, the template being personalized based at least in part on at least one of a first user attribute or a first user preference, the request being generated in response to an indication of the first user interacting with particular content that is separate from the landing page;
   determining a first content portion for display in the landing page based on information associated with the request;
   determining a second content portion for display in the landing page based on information associated with the entity, based at least in part on a relevance of the second content portion to at least one of the first user or the first content portion, the second content portion being different from the first content portion, and populated on the landing page, based at least in part on a rank order corresponding to the relevance of the second content portion;
   determining a third content portion for display in the landing page based on information associated with the first user, the third content portion being different from the first and second content portions, and the information associated with the user including at least information indicated by a second user as being of interest to the second user on a third party social network, the first user and the second user being connected on the third party social network; and
   providing the landing page for display, the landing page including the first content portion, the ranked second content portion, and the third content portion, wherein each of the first, second, and third content portions is filtered based on a set of rules established by the entity to display content associated with the entity.

2. The computer-implemented method of claim 1, further comprising:
   determining a ranking order for the first content portion, the second content portion, and the third content portion, the ranking order based at least on a determined relevance of each of the first content portion, the second content portion, and the third content portion to an item associated with the particular content; and
   determining a display location in the landing page for each of the first content portion, the second content portion, and the third content portion based at least on the ranking order.

3. The computer-implemented method of claim 1, wherein at least one of the first content portion, the second content portion, or the third content portion includes at least one of advertising content, images associated with a brand, text, or rich media.

4. The computer-implemented method of claim 1, wherein the third content portion includes content associated with an item available for purchase, the item available for purchase indicated by the second user on the third party social network as having been purchased by the second user.

5. The computer-implemented method of claim 1, wherein the information associated with the first user comprises information indicating a consumer segment to which the user belongs, and wherein determining the third content portion further comprises:
   determining an attribute associated with each user belonging to the consumer segment; and
   determining content indicated as being associated with the attribute.

6. The computer-implemented method of claim 1, wherein the particular content comprises a display advertisement featuring an item, and wherein determining the first content portion further comprises:
   determining an attribute associated with the item featured in the display advertisement; and
   determining content indicated as being associated with the attribute.

7. The computer-implemented method of claim 1, wherein the information associated with the first user comprises information indicating a product previously purchased by the first user, and further comprising:
   determining one or more products indicated as related to the product previously purchased by the first user;
   determining a fourth content portion for display in the landing page based on the information associated with the first user, the fourth content portion comprising information associated with at least one of the one or more products indicated as related to the product previously purchased by the first user.

8. The computer-implemented method of claim 1, wherein the request to access the landing page is associated with a display advertisement featuring an item that was targeted to the user based on a search query containing at least one token, and wherein determining at least one of the first content portion, the second content portion, or the third content portion for display in the landing page comprises:
   receiving a referrer link containing the at least one token;
   parsing the referrer link to obtain the at least one token; and
   determining content associated with the at least one token.

9. A computer-implemented method, comprising:
   under the control of one or more computer systems configured with executable instructions,
   receiving a request to access a landing page, the request transmitted in response to an indication of a first user interacting with display content associated with a first item offered by a first entity, the landing page being generate from a template, the template being personalized based at least in part on at least one of a first user attribute or a first user preference, and the display content being separate from the landing page;
   determining a plurality of other items offered by the first entity;

determining primary content, the primary content being associated with the first item;

determining supplemental content associated with one or more of the plurality of other items, at least a portion of the supplemental content based on information associated with the first user, the information associated with the first user including at least information indicated by a second user as being of interest to the second user on a third party social network, the first user and the second user being connected on the third party social network, and at least a second portion of the supplemental content based on a ranking ordering corresponding to a relevance of the supplement content to the primary content; and providing the landing page, the landing page including a display of the primary content and the supplemental content, the primary content being different from the supplemental content, the primary content and the supplemental content further being filtered by the first entity such that the primary content and the supplemental content are associated with the first entity.

10. The computer-implemented method of claim 9, further comprising:

determining a template for a web page, the template having a plurality of placements capable of being populated with content;

determining a ranking order for the primary content and the supplemental content, the ranking order based at least in part on relevance to the first item; and generating the landing page using the template, the plurality of placements in the template being populated using at least the primary content and the supplemental content based at least in part on the ranking order.

11. The method of claim 10, wherein providing the landing page further comprises:

populating each of the plurality of placements with one of the primary content or the supplemental content.

12. The method of claim 9, wherein the supplemental content is directed to one or more items offered by the first entity that are related to the first item.

13. The method of claim 9, wherein the supplemental content is based at least in part on one or more consumer segments to which the first user belongs.

14. The method of claim 9, wherein the one or more of the plurality of other items includes one or more top selling items offered by the first entity.

15. The method of claim 9, wherein the supplemental content is directed to one or more items offered by the first entity on behalf of a single brand.

16. The method of claim 15, wherein the supplemental content is directed to one or more items offered by the single brand that are related to the first item.

17. A system, comprising:

a processor; and a memory device including instructions that, when executed by the processor, cause the processor to:

receive a request to access a landing page, the landing page being associated with an entity and a template, the template being personalized based at least in part on at least one of a first user attribute or a first user preference, and the request being generated in response to an indication of the first user interacting with particular content that is separate from the landing page;

determine a first content portion for display in the landing page based on information associated with the request;

determine a second content portion for display in the landing page based on information associated with the entity and at least in part on a relevance of the second content portion to at least one of the first user or the first content portion, the second content portion being different from the first content portion, and populated on the landing page, based at least in part on a rank order corresponding to the relevance of the second content portion;

determine a third content portion for display in the landing page, the third content portion being different from the first content portion and the second content portion, based on information associated with the first user, the information associated with the user including at least information indicated by a second user as being of interest to the second user on a third party social network, the first user and the second user being connected on the third party social network; and provide the landing page for display, the landing page including the first content portion, the ranked second content portion, and the third content portion, wherein each of the first, second, and third content portions is filtered based on a set of rules established by the entity to display content associated with the entity.

18. The system of claim 17, wherein instructions further cause the processor to:

determine a ranking order for the first content portion, the second content portion, and the third content portion, the ranking order based at least on a determined relevance of each of the first content portion, the second content portion, and the third content portion to an item associated with the particular content; and determine a display location in the landing page for each of the first content portion, the second content portion, and the third content portion based at least on the ranking order.

19. The system of claim 17, wherein the information associated with the first user comprises information indicating a consumer segment to which the user belongs, and wherein instructions for determining the third content portion further cause the processor to:

determine an attribute associated with each user belonging to the consumer segment; and determine content indicated as being associated with the attribute.

20. The system of claim 17, wherein the information associated with the first user comprises information indicating a product previously purchased by the first user, and further comprising instructions to cause the processor to:

determine one or more products indicated as related to the product previously purchased by the first user;

determine a fourth content portion for display in the landing page based on the information associated with the first user, the fourth content portion comprising information associated with at least one of the one or more products indicated as related to the product previously purchased by the first user.

* * * * *